US010952572B2

(12) United States Patent
Hibbs

(10) Patent No.: US 10,952,572 B2
(45) Date of Patent: Mar. 23, 2021

(54) TOILET APPARATUS AND METHOD OF USE

(71) Applicant: Coversan, LLC, Savannah, MO (US)

(72) Inventor: Curtis Randall Hibbs, Savannah, MO (US)

(73) Assignee: Coversan, LLC, Savannah, MO (US)

( * ) Notice: Subject to any disclaimer, the term of this patent is extended or adjusted under 35 U.S.C. 154(b) by 0 days.

(21) Appl. No.: 16/689,766

(22) Filed: Nov. 20, 2019

(65) Prior Publication Data
US 2020/0085263 A1  Mar. 19, 2020

Related U.S. Application Data

(63) Continuation of application No. 15/688,194, filed on Aug. 28, 2017, now abandoned, which is a continuation of application No. 14/815,181, filed on Jul. 31, 2015, now Pat. No. 9,743,815.

(51) Int. Cl.
| | | |
|---|---|---|
| *A47K 11/03* | (2006.01) | |
| *A47K 17/00* | (2006.01) | |
| *B01F 11/00* | (2006.01) | |
| *B01F 15/02* | (2006.01) | |
| *A47K 11/10* | (2006.01) | |

(52) U.S. Cl.
CPC .............. *A47K 11/03* (2013.01); *A47K 17/00* (2013.01); *B01F 11/0045* (2013.01); *B01F 11/0065* (2013.01); *B01F 15/0251* (2013.01); *A47K 11/105* (2013.01); *Y02A 50/30* (2018.01)

(58) Field of Classification Search
CPC ...... A47K 11/03; A47K 17/00; A47K 11/105; B01F 11/0045; B01F 11/0065; B01F 15/0251

USPC .......................................................... 4/4, 467
See application file for complete search history.

(56) References Cited

U.S. PATENT DOCUMENTS

| | | | |
|---|---|---|---|
| 412,271 A | 10/1889 | Kinney | |
| 658,982 A | 10/1900 | Fischer | |
| 979,386 A | 12/1910 | Druzbach | |
| 2,882,534 A | 4/1959 | Jauch et al. | |
| (Continued) | | | |

FOREIGN PATENT DOCUMENTS

| | | |
|---|---|---|
| CN | 101053496 A | 10/2007 |
| JP | 08275907 A | 10/1996 |
| (Continued) | | |

OTHER PUBLICATIONS

PCT/US2016/042931 International Search Report and Written Opinion, 7 pages, dated Feb. 19, 2019.
(Continued)

*Primary Examiner* — Huyen D Le
(74) *Attorney, Agent, or Firm* — Erickson Kernell IP, LLC; John C. McMahon

(57) ABSTRACT

A toilet apparatus has a waste material receiving bowl with an opening at a top of the waste material receiving bowl. A bag receives and retains waste material and an absorbent media introduced through the opening. An agitation device agitate the absorbent media and the waste material at a lower portion of the bag to cause the absorbent media to at least substantially cover the waste material while the agitation device is not contacting the absorbent media and the waste material.

2 Claims, 8 Drawing Sheets

(56) References Cited

U.S. PATENT DOCUMENTS

| | | | |
|---|---|---|---|
| 3,023,425 A * | 3/1962 | Illo | A47K 11/03 |
| | | | 4/469 |
| 5,088,134 A | 2/1992 | Douglas | |
| 5,307,524 A | 5/1994 | Veal | |
| 6,138,291 A | 10/2000 | Kot | |
| 8,973,774 B1 | 3/2015 | Stravitz | |
| 9,743,815 B2 * | 8/2017 | Hibbs | B01F 11/0045 |
| 2008/0209623 A1 * | 9/2008 | Schaaf | C05F 3/04 |
| | | | 4/449 |
| 2010/0275363 A1 | 11/2010 | Irizarry-Lugo | |
| 2013/0185866 A1 | 7/2013 | Cheung | |
| 2014/0090162 A1 * | 4/2014 | Gunn | A47K 11/035 |
| | | | 4/476 |
| 2015/0164292 A1 | 6/2015 | Shin-Ya | |
| 2017/0007082 A1 | 1/2017 | Li | |
| 2017/0150853 A1 * | 6/2017 | Schaaf | C05F 3/04 |
| 2018/0199770 A1 * | 7/2018 | Hibbs | B01F 15/0022 |

FOREIGN PATENT DOCUMENTS

| | | | |
|---|---|---|---|
| JP | 2003265355 A | 9/2003 | |
| JP | 2007136154 A | 6/2007 | |
| JP | 2009220106 A | 10/2009 | |
| KR | 20150056708 A | 5/2015 | |
| WO | 2011155849 A1 | 12/2011 | |

OTHER PUBLICATIONS

International Search Report for PCT/US16/42931, Toilet Apparatus and Method of Use, dated Oct. 20, 2016

* cited by examiner

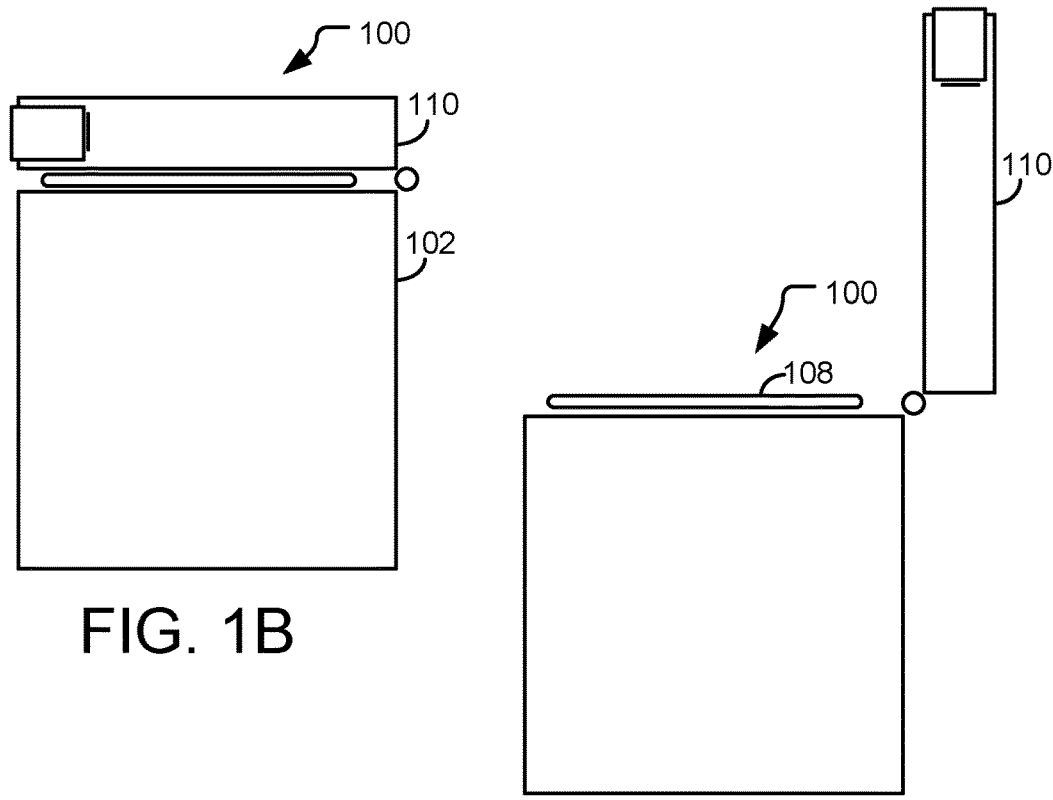
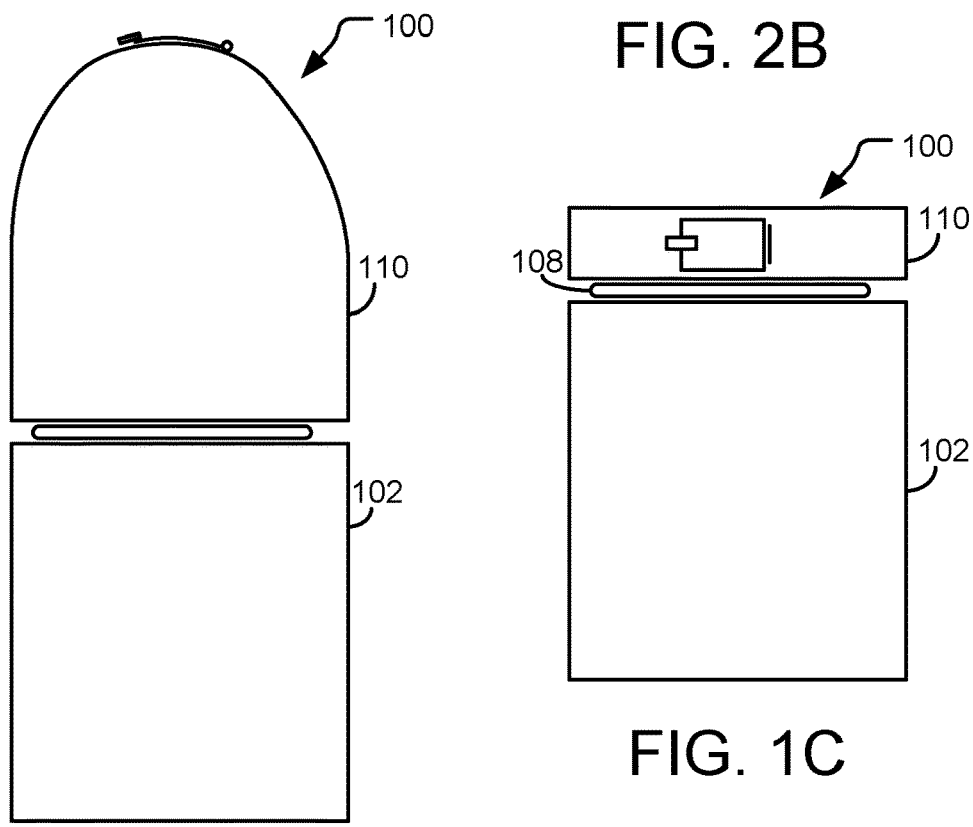

TOILET APPARATUS AND METHOD OF USE

RELATED APPLICATIONS

The application is a continuation of U.S. patent application Ser. No. 15/688,194, filed Aug. 28, 2017 that is a continuation of U.S. patent application Ser. No. 14/815,181, filed Jul. 31, 2015, and entitled Toilet Apparatus and Method of Use, now U.S. Pat. No. 9,743,815, issued Aug. 29, 2017, the entire contents of both of which are incorporated herein by reference.

FEDERALLY SPONSORED RESEARCH OR DEVELOPMENT

Not Applicable.

COMPACT DISK APPENDIX

Not Applicable.

FIELD OF INVENTION

The present invention generally relates to waste management devices, and more particularly, to a toilet apparatus and method of its use.

BACKGROUND

Toilets, which may also be referred to as commodes, generally refer to devices used for the disposal of human waste. Flush toilets are a common type of toilet that uses water to facilitate removal of the waste to a processing site, such as a septic system, for its decomposition. More recently, however, other toilet designs have been implemented that can, among other things, reduce water usage levels required for their operation. Examples of such toilets include composting toilets that process the waste locally, and chemical based toilets that use chemicals to deodorize the waste until it can be moved to another location for processing. Nevertheless, each of these toilet designs require special handling techniques to ensure the safe movement of waste to a sanitary location for the toilet's continued use. It is with these problems in mind, among other problems, that embodiments of the present disclosure have been developed.

SUMMARY

According to one embodiment, a toilet apparatus for use with a bag has a housing with an opening at a top of the housing through which the bag may be placed, the bag configured to receive and retain waste material and an absorbent media introduced through the opening. An agitation device agitate the absorbent media and the waste material at a lower portion of the bag to cause the absorbent media to at least substantially cover the waste material while the agitation device is not contacting the absorbent media and the waste material.

A method for a toilet apparatus includes providing a housing with an opening at a top of the housing through which the bag may be placed, the bag configured to receive and retain waste material and an absorbent media introduced through the opening. The method includes agitating, using an agitation device, the absorbent media and the waste material at a lower portion of the bag to cause the absorbent media to at least substantially cover the waste material while the agitation device does not contact the absorbent media and the waste material.

In another aspect, a toilet control system comprises at least one memory to store instructions and at least one processor to execute the instructions to control an absorbent media dispenser to dispense absorbent media into a bag placed in a housing of a toilet apparatus and control an electronic agitation device to agitate the absorbent media and the waste material at a lower portion of the bag while the agitation device is not contacting the absorbent media and the waste material.

In another aspect, a toilet control method comprises controlling, by at least one processor, an absorbent media dispenser to dispense absorbent media into a bag placed in a housing of a toilet apparatus. The method includes controlling, by the at least one processor, an agitation device to agitate an absorbent media and the waste material at a lower portion of the bag while the agitation device is not contacting the absorbent media and the waste material.

In another aspect, a toilet apparatus comprises a housing with an opening a bag placed through the opening, the bag to receive waste material and an absorbent media introduced through the opening. An agitation device agitates the absorbent media and the waste material at a bottom of the bag while not contacting the absorbent media and the waste material.

BRIEF DESCRIPTION OF THE DRAWINGS

FIGS. 1A, 1B, and 1C are perspective, side, and front views, respectively, illustrating an example toilet apparatus with its lid in the closed position according to the teachings of the present disclosure.

FIGS. 2A, 2B, and 2C are perspective, side, and front views, respectively, illustrating an example toilet apparatus with its lid in the open position according to the teachings of the present disclosure.

DETAILED DESCRIPTION

As described previously, current toilet designs have often required special handling techniques for the safe and sanitary removal of waste. Nevertheless, currently implemented solutions for this problem have required the use of one or more additional materials that could potentially be harmful to the environment. For example, flush toilets often require the use of relatively large amounts of water, which has been recognized as a valuable commodity, particularly in locations where water has become a scarce resource. Chemical toilets use less water than their flush toilet counterparts, but require the use of chemicals that typically hinders the efficient decomposition of the waste, even after the waste is removed from the toilet. Additionally, composting toilets may use one or more types of microbes to decompose the waste in place. Yet the composting process provided by these microbes can often generate unpleasant odors that may require additional mechanisms, such as ventilation systems, thus limiting the locations at which these composting toilets may be used. Embodiments of the present disclosure provide a solution to these problems, among other problems, using a toilet apparatus and method that uses disposable bags which can be easily handled for safe and sanitary removal of waste from the toilet by keeping the waste separated from the components of the toilet apparatus, and mechanical vibration to enhance mixing of the waste with an absorbent media as it is introduced into the toilet such that odors normally associated with the waste are minimized as well as providing enhanced sterilization by dehydrating the waste material immediately upon entry of the waste into the toilet.

Figures 1A, 2A:
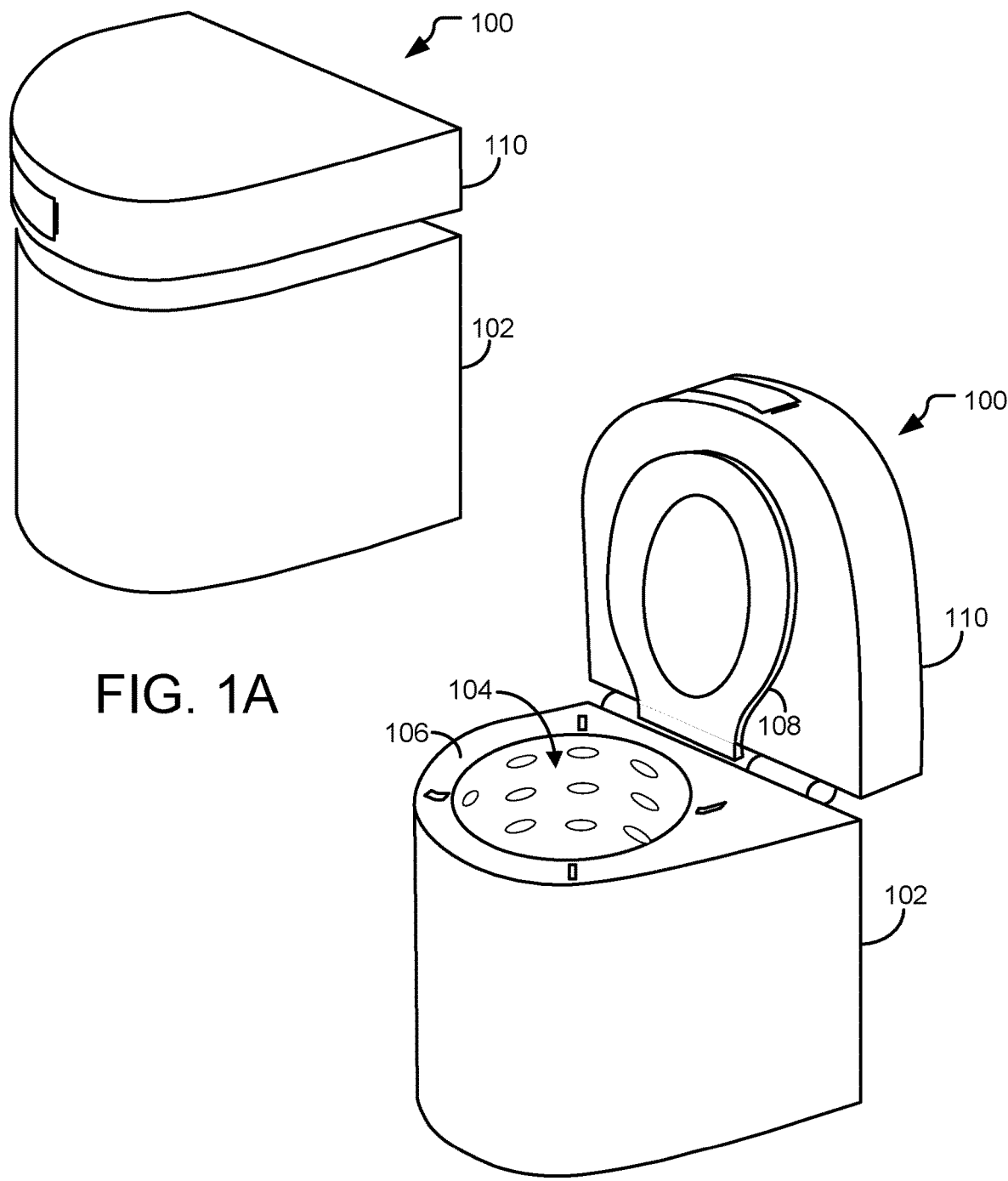

FIGS. 1A through 2C illustrate an example toilet 100 according to one embodiment of the present disclosure. In particular, FIGS. 1A and 2A show perspective views of the toilet 100, FIGS. 1B and 2B show side views of the toilet 100, while FIGS. 1C and 2C show front views of the toilet 100. The toilet 100 includes a housing 102 for housing a waste material receiving bowl 104, and a top member 106 with an opening defining an annular seating surface. In one embodiment, the annular seating surface may include a seat 108 that is configured between the top member 106 and a lid 110. The toilet 100 also includes a lid 110. The seat 108 and the lid 110 are hingedly affixed to the housing 102. The lid 110 and seat 108 are movable from a closed position (FIGS. 1A, 1B, and 1C) adjacent to the top member 106 to an open position away from the top member 106 (FIGS. 2A, 2B, and 2C). Although FIGS. 1A through 2C show several features of the toilet 100, it should be understood that the toilet 100 may include additional, fewer, or different features than those described herein without departing from the spirit or scope of the present disclosure.

Figure 3:
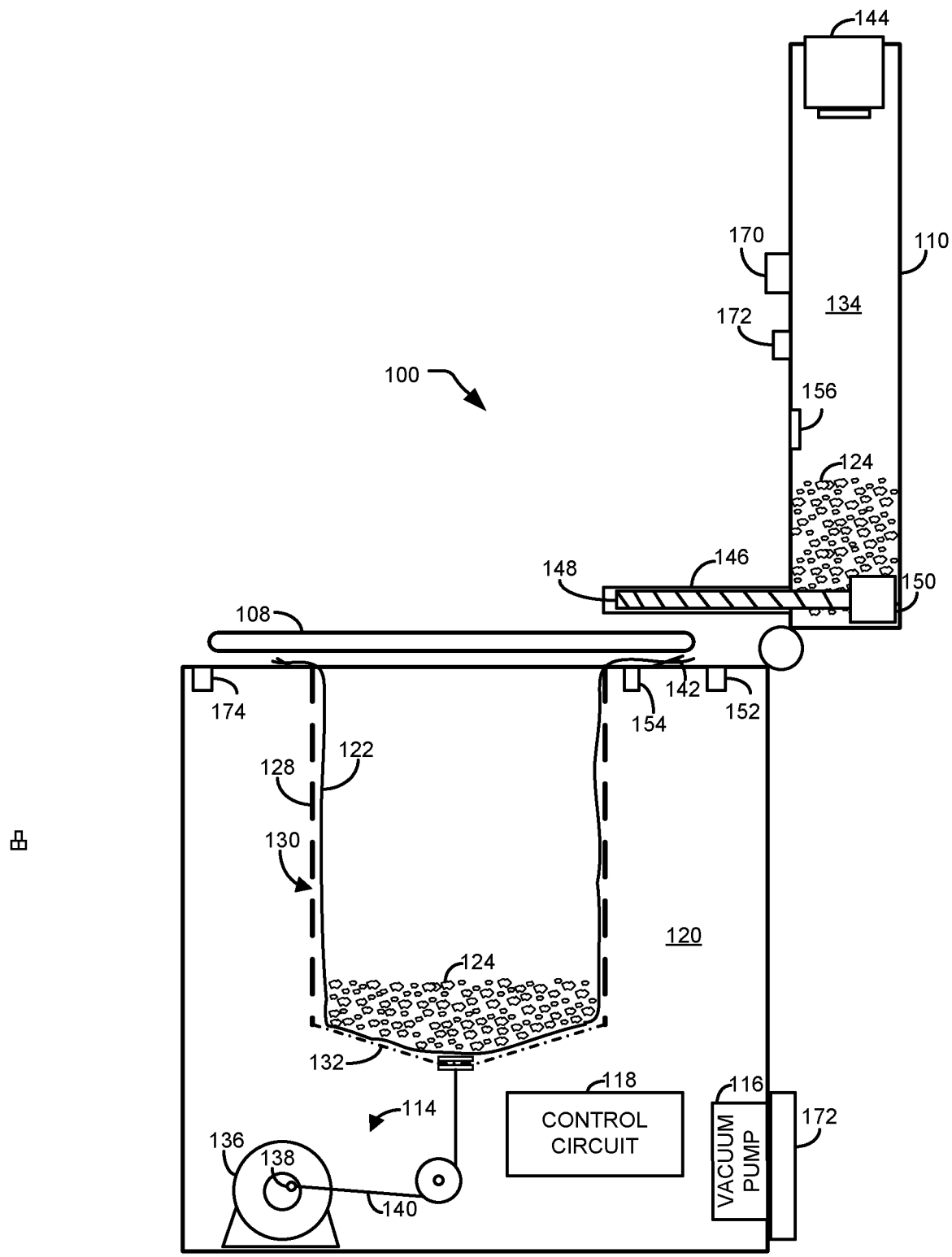
FIG. 3 illustrates a cut-away view showing several features of the example toilet according to one embodiment of the present disclosure.

FIG. 3 illustrates a cut-away view showing several features of the example toilet 100 according to one embodiment of the present disclosure. In general, the space between the housing 102 and the bowl 104 forms a chamber 120 for housing several components of the toilet 100, such as a vibrating mechanism 114 or other agitation device, a vacuum pump 116, and a control circuit 118 that controls the operation of the vibrating mechanism 114 and the vacuum pump 116.

The toilet 100 can be configured with a disposable bag 122 that is releasably secured in the bowl 104 and configured to receive and hold a specified amount of absorbent media 124. In general, the disposable bag 122 that can be releasably secured inside the bowl 104 and partially filled with an absorbent media 124 such that when used, agitation may be imparted to the absorbent media 124 for mixing with any waste introduced into the disposable bag 122 while keeping the components of the toilet, such as the vibrating mechanism 114 or other agitation device, separated from communication with (i.e., not touching) the waste material and absorbent media in the disposable bag 122. Following the introduction of waste, the disposable bag 122 may be removed from the bowl 104 and disposed of and another disposable bag 122 releasably secured to the bowl 104 for ensuing uses of the toilet 100.

Certain embodiments of the toilet 100 may provide advantages not heretofore recognized by traditional toilet designs. For example, embodiments of the toilet 100 may reduce or eliminate the extraneous use of certain materials required by traditional toilet designs, such as water, chemical treatment, biological decomposing materials, and the like. Additionally, the disposable bag 122 provides a temporary chamber for receiving waste and disposing of the waste in a safe, sanitary manner, while the absorbent media provides for at least partial encapsulation of the waste such that any odors generated by the waste are minimized. Additionally, because little or no water is required for its operation, the toilet 100 may be used in locations where a source of water or means to manage the processing and removal of waste may not be readily available, such as in a portable, remote environment (e.g., during a long road trip, a camping excursion, etc.).

The bowl 104 and the housing 102 form an enclosed chamber 120 that is generally sealed from the outside environment. When the vacuum pump 116 is turned on, it generates a vacuum (e.g., negative) pressure inside the chamber 120. In one embodiment, the vacuum pump 116 includes one or more fans that, when powered on, blow air from the chamber 120 to the ambient environment. Additionally, a certain quantity of holes may be left uncovered by the bag 122 so that an airflow may be generated from the bowl 104 into the chamber 120 for minimizing odors generated during the use of the toilet 100. Nevertheless, the vacuum pump 116 may include any device that creates a vacuum condition inside the chamber 120 when powered on, such as a piston-driven pump having check valves at its entry and exit ports. Additionally, the vacuum pump 116 may be omitted if a vacuum condition is not needed or desired for the operation of the toilet 100.

The bowl 104 may be made of any suitable material (e.g., sheet metal, plastic, fiberglass, etc.) and have any desired shape to receive and temporarily hold the disposable bag 122 against its surface. In one embodiment, the bowl 104 includes a side member 128 formed of sheet metal into a cylindrical shape and has holes 130 configured along its extent, such that, when the vacuum pump 116 is powered on, the disposable bag 122 is urged against the surface of the side member 128. Also, the bowl 104 includes a bottom member 132 that is formed of an air permeable material (e.g., screen, fabric, etc.) that allows the vacuum pressure generated in the chamber 120 to urge the disposable bag 122 against the bottom member 132. In one embodiment, the bottom member 132 is resilient or stretchable to allow vibrational energy generated by the vibrating mechanism 114 to be transferred to the absorbent media 124 for causing movement or agitation of the absorbent media 124 for enhanced mixing with any waste introduced into the disposable bag 122.

The vibrating mechanism 114 forms an agitation device for agitating the absorbent media 124 disposed in the disposable bag 122. In one embodiment, the vibrating mechanism 114 includes a motor 136 with an eccentrically mounted pin 138 that is coupled to the bottom member 132 via a line 140 (e.g., rope, twine, strap, cable, etc.) such that rotation of the motor 136 causes the vibrational energy to be imparted in a generally vertical direction (e.g., up and down) on the bottom member 132. Nevertheless, other embodiments contemplate that the vibrating mechanism 114 may include any mechanism that generates vibrational energy that is imparted into the absorbent media 124. For example, the vibrating mechanism 114 may be a motor having an eccentrically mounted weight on its shaft, which is physically coupled to the bottom member 132. Certain embodiments of the toilet 100 that use vertical excitation of the absorbent media 124 may be advantageous in that vibrational excitation of the absorbent media 124 may be maximized relative to the overall vibration incurred by the toilet 100 during its use.

The absorbent media 124 may include any suitable type of material that mixes with the waste under the influence of vibrational energy. In one embodiment, the absorbent media is a granular material, such as sand, pumice, pet litter, zeolite, clay, sepiolite, crushed cellulose, etc.). In one embodiment, the frequency (e.g., rotational speed of the motor) and/or amplitude (e.g., cyclical distance traveled by the bottom member 132) of the vibrational energy may be selected according to the size and density of the absorbent media 124. In this manner, a specified level and frequency of vibrational energy may be produced that optimally excites the absorbent media 124 according to its size, weight, and/or resiliency (e.g., bounciness). For example, when a particular type of absorbent media 124 having a specified size, weight, and/or resiliency is selected, the frequency and/or amplitude of the vibrating mechanism 114 may be altered for optimal movement of the absorbent media 124 in the bag 122. Embodiments of the absorbent media 124 may serve as a desiccant to aid in sterilization by effectively drawing moisture away from the waste material, thus reducing sanitary hazards typically encountered with organic waste as well as minimizing odors generated by the waste material.

The amplitude and frequency may be altered in any suitable manner. For example, the motor 136 may be a variable speed motor whose speed may be altered to change the frequency while the amplitude may be altered by adjusting the angular distance of the pin 138 from the axis of the shaft. For example, the control circuit 118 may display a user interface 512 (FIG. 5) for receiving user input associated with a specified frequency and/or amplitude to be used according to a type of absorbent media 124 placed in the bag 122. Alternatively, the control circuit 118 may have one or more switches that enable a user to select one or more frequencies and/or one or more amplitudes with, or without, a displayed user-interface.

In one embodiment, the bottom member 132 of the bowl 104 has a conical shape, or other suitable shape, to urge the absorbent media and waste material toward the center of the bowl under the force of gravity. For example, the conical shape may be provided by a static tension force exerted on the bottom member 132 by the line 140. Nevertheless, the conical shape may be provided using any suitable technique. For example, the bottom member 132 may be formed from a sheet of material (e.g., sheet metal) that is resilient in consistency (e.g., spring-like) and formed into a conical shape and perforated to allow airflow therethrough.

In one embodiment, the lid 110 includes a hopper 134 for storing the absorbent media 124. A latch door 144 or other selectively closable mechanism, is provided to allow entry of the absorbent media 124 into the hopper 134, and an absorbent media dispenser 146 is provided for transferring a specified amount of absorbent media 124 from the hopper 134 into the disposable bag 122 each time the toilet 100 is used. In other embodiments, the toilet 100 may include a hopper placed at other locations, such as behind the toilet, beside the toilet, or underneath the toilet.

In one embodiment, the absorbent media dispenser 146 includes an auger assembly having an auger 148 configured in the dispenser 146 that is in communication with the inside of the lid 110. The auger is rotationally coupled to a motor 150 such that when the motor is turned on, a specified amount of absorbent media 124 may be dispensed into the disposable bag 122. In one embodiment, the dispenser 146 may be hingedly affixed to the lid 110 such that it may be rotated to allow for closure of the lid 110.

In one embodiment, the auger 148 may optionally have a sawtooth shape or other suitable shape for grinding, chipping, shredding, pulverizing (e.g., breaking apart) a concentrated amount of absorbent media 124 provided in block form (e.g., a brick) into an expanded matrix for use in the toilet 100. Certain embodiments employing absorbent media 124 provided as relatively small concentrated blocks may provide certain advantages, such as a relatively smaller volume required for their storage prior to use as well as their relative ease of use compared to absorbent media 124 provided in expanded granular form. Although non-block forms of absorbent media may be used in other embodiments.

In another embodiment, the dispenser 146 may include a media retention mechanism to inhibit or reduce unwanted absorbent media 124 when not needed or desired, such as when the toilet 100 is not in use. For example, the exit or end of the dispenser may include a spring-loaded valve that is biased in a closed position when absorbent media 124 is not being actively discharged from the auger 148. As another example, the motor 150 driving the auger 148 may be rotated in a backwards direction for a specified period of time following dispensing of the absorbent media 124 such that any absorbent media 124 still within the dispenser 146 may be driven back into the hopper 134.

The disposable bag 122 is sized to fit within the bowl 104, and be made of any suitable material (e.g., plastic, paper, etc.) that receives and holds absorbent media 124 and waste. In one embodiment, the disposable bag 122 is made of a material that can decompose when processed using standard waste treatment techniques. The bag 122 includes an upper edge that may be releasably secured to the top member 106 of the toilet 100 using a suitable releasable securement mechanism. In one embodiment, the releasable securement mechanism includes one or more tabs 142 configured on the top member 106 of the toilet 100 on which the top edge of the bag 122 may be impaled for holding the bag 122 in place. Other embodiments contemplate that other types of releasable securement mechanisms may be used. For example, the releasable securement mechanism may include a hook-and-loop (e.g., Velcro) strips molded into the top edge of the disposable bag 122 and on the top member 106 of the toilet 100. For another example, the releasable securement mechanism may include a bag 122 with a drawstring or elastic member extending around the periphery of its edge for releasable securement to the top member 106. For yet another example, the releasable securement mechanism may include spring-loaded clips, or other mechanisms, that do not impale the disposable bag 122.

The toilet 100 may also include one or more sensors that may be used by the control circuit 118 to control its operation. For example, a lid position sensor 152 may be provided that senses when the lid 110 is moved from the closed to the open position. A bag presence sensor 154 may be provided that senses when a bag 122 is disposed within the bowl. Also, an absorbent media level sensor 156 may be provided to sense the level of absorbent media 124 stored in the hopper 134. Also, an occupant sensor 174 may be provided to sense when a user is occupying the toilet 100. Any suitable types of sensors may be implemented with the sensors 152, 154, 156, 172, or 174. For example, the lid position sensor 152 may be a door switch, the bag presence sensor 154 may be an optical sensor that detects differing levels of light when covered by the bag 122, and the absorbent media sensor 156 may be a capacitive device that changes its capacitance level when in contact with the absorbent media 124, and the occupant sensor 174 may be a temperature sensor that senses the typical surface temperature of a human body.

In one embodiment, an ultraviolet lamp 170 and a humidity sensor 172 (e.g., hygrometer) may be included on the lower surface of the lid 110. The control circuit 118 may function in response to signals obtained from the humidity sensor 172 to control operation of the ultraviolet lamp 170 for various purposes, such as disinfection of bacteria or other pathogens from the toilet 100 when not in use, or for a nightlight when used at night. For example, the control circuit 118 may, using the humidity sensor 172, sense when a moisture level in the toilet 100 has exceeded a specified threshold to activate the ultraviolet lamp 170.

Although FIG. 3 illustrates several example features of the toilet 100, it is contemplated that other embodiments of the toilet 100 may have more, different, or fewer features than those described herein. For example, the toilet 100 may include a lid 110 without a hopper 134 and/or dispenser 146 if manual entry of the absorbent media 124 into the disposable bag 122 is desired. For another example, the toilet 100 may be provided without a seat 108 if not needed or desired. For yet another example, the toilet 100 may include a different type of agitation device than the vibrating mechanism 114 for agitating the absorbent media 124, such as a solenoid physically coupled to the bottom member 132 or one that will be described in detail below with reference to FIG. 4.

Figure 4:
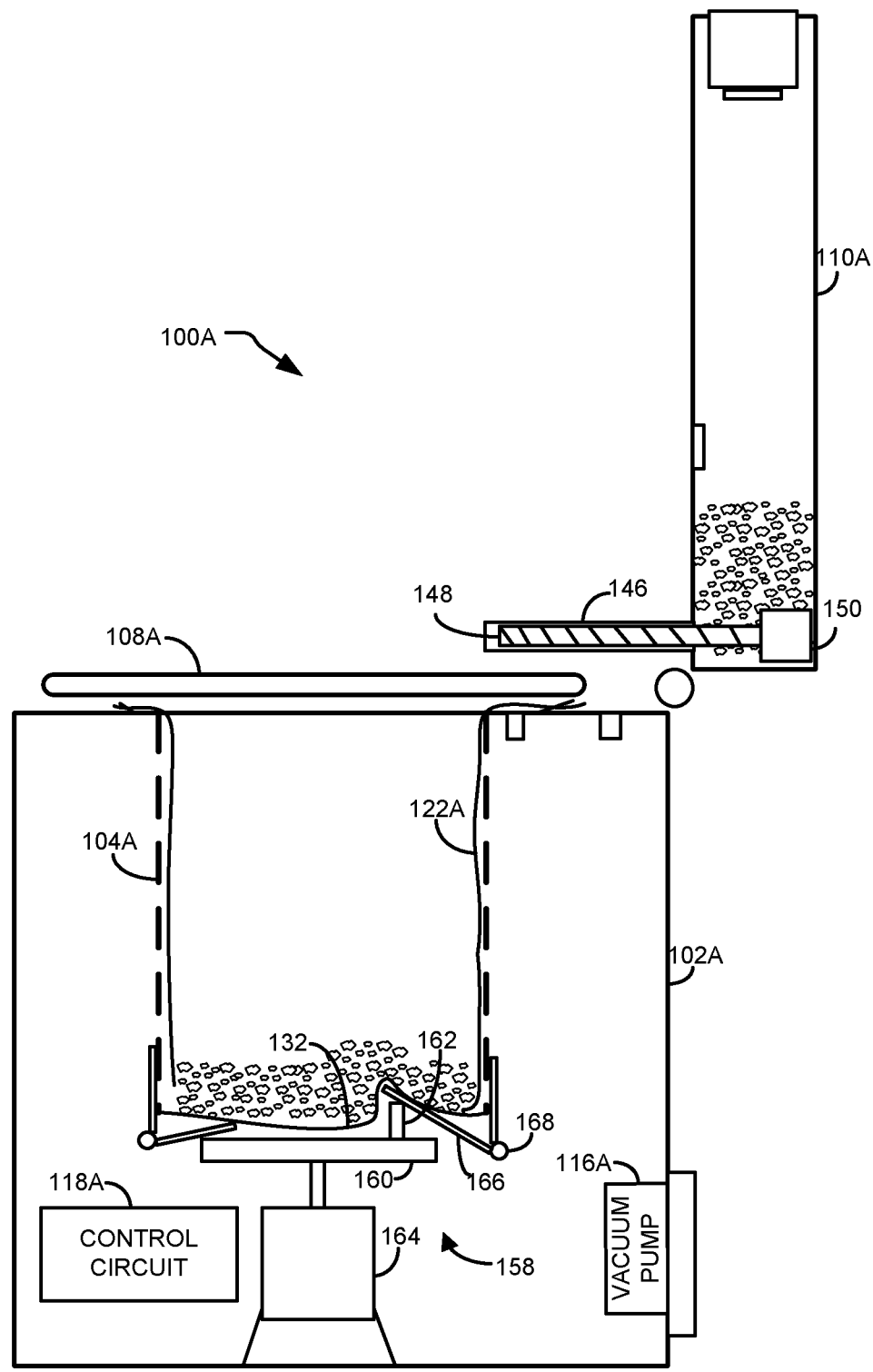
FIG. 4 illustrates a cut-away view showing several other features of the example toilet according to one embodiment of the present disclosure.

FIG. 4 illustrates another absorbent media agitation device that may be implemented with the toilet 100 according to another embodiment of the present disclosure. As shown, the toilet 100A includes a housing 102A, a bowl 104A, a lid 110A, a seat 108A, a vacuum pump 116A, a control circuit 118A, and a disposable bag 122A that are similar in design and construction to the housing 102, the bowl 104, the seat 108, the lid 110, the vacuum pump 116, the control circuit 118, and the bag 122 of FIG. 3. The toilet 100A of FIG. 4 differs, however, in that it includes an absorbent media agitation device 158 formed from a disk 160 with an eccentrically mounted cam 162, that is rotated by a motor 164. The absorbent media agitation device also includes multiple levers 166 (e.g., four levers) that are equally or unequally spaced apart, and hingedly affixed along the periphery of the bowl 104 via hinges 168. As the motor spins the cam 162, it interacts with multiple spaced-apart levers 166 to alternatively lift each lever 166 such that successive regions of the bottom member 132 are lifted for agitating the absorbent media 124. Additionally, the bag 122A separates the absorbent media and waste from the components of the toilet 100A so the waste material and absorbent media do not contact (i.e., come into communication) with the agitation device.

The media agitation device as shown in FIG. 4 may provide certain advantages for use with the toilet 100A. For example, the levers 166 may provide for enhanced vertical movement of the absorbent media at relatively lower frequencies than what may be provided by a vibrating device, such as that described above with respect to FIG. 3. Such agitation may be particularly beneficial when used with absorbent media that is relatively soft in consistency and low in density, such as loose fill cellulose typically used for insulating homes or other climatized structures.

Figure 5:
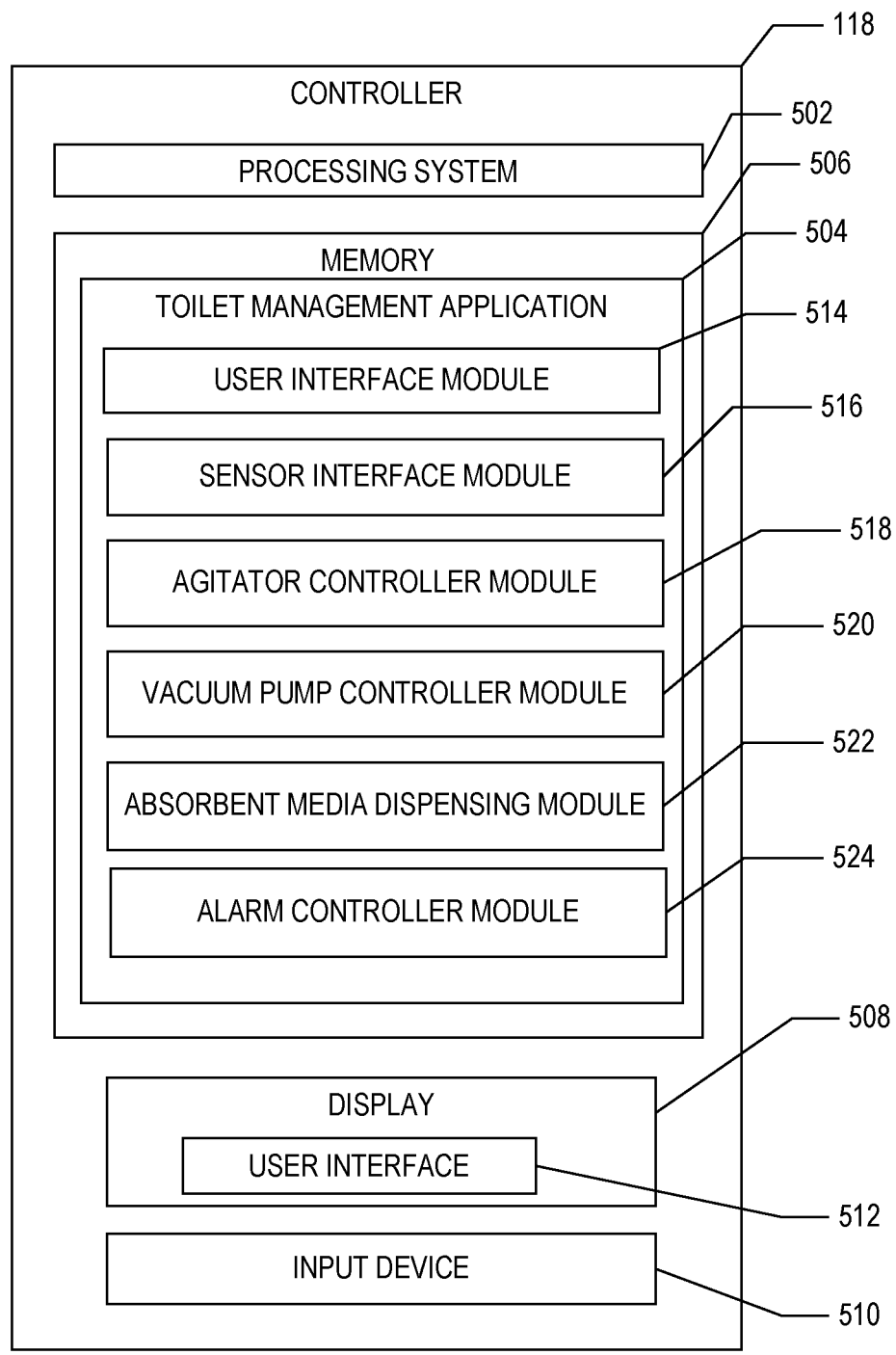
FIG. 5 is a block diagram showing an example control circuit that may be used by the toilet apparatus according to the teachings of the present disclosure.

FIG. 5 illustrates one example of the control circuit 118 that may be used to control the operation of the toilet 100 according to one embodiment of the present disclosure. The control circuit 118 includes a processing system 502 that executes a toilet management application 504 stored in a memory 506 (e.g., computer readable media). Although the control circuit 118 is shown and described as a computer-based design incorporating instructions stored in a memory 506 and executed by a processor 502, it should be understood that the control circuit 118 may be embodied in other specific forms, such as using discrete and/or integrated analog circuitry, field programmable gate arrays (FPGAs), application specific integrated circuitry (ASICs), or any combination thereof. Additionally, the control circuit 118 may be omitted if manual operation of the toilet 100 is desired.

The processing system 502 includes one or more processors or other processing devices and memory. The one or more processors may process machine/computer-readable executable instructions and data, and the memory may store machine/computer-readable executable instructions and data including one or more applications, including the application 504. A processor is hardware and memory is hardware. The memory 506 includes random access memory (RAM) and/or other non-transitory memory, e.g., a non-transitory computer-readable medium such as one or more flash disks or hard drives. The non-transitory memory may include any tangible computer-readable medium including, for example, magnetic and/or optical disks, flash drives, and the like.

The control circuit 118 may also include a display 508, such as a liquid crystal display (LCD), one or more light emitting diodes (LEDs), an LED display, a touch screen, a capacitive display, or another display for displaying configuration settings associated with the application 504. The control circuit 118 may also include an input device 510, such as one or more buttons, switches, or other electromechanical device for providing user input to the application 504. In one example, the display 508 and input device 510 may include a touch screen display for receiving user input and displaying one or more characteristics associated with operation of the application 504. In one embodiment, the display 508 may include a user interface 512 for displaying information to the user, and receiving user input from the user.

In general, the processing system 502 executes a toilet operation application 504 with one or more modules to control the operation of the toilet 100. In certain embodiments, the application 504 may control all operating aspects of the toilet 100 described herein. In other embodiments, the application 504 may control only one or a subset of the operating aspects of the toilet 100 described herein.

A user interface module 514 facilitates the receipt of user data and/or other communications from the input device 510 of the control circuit 118. In one example, the control circuit 118 generates and executes the user interface 512 that displays an interactive display such as the display 508, or other suitable user interface mechanism including one or more selectable fields, editing screens, and the like for displaying status information associated with one or more aspects of the application 504, such as operational status information, power source (e.g., battery) condition, timer values to be applied to the operation of the agitator, the vacuum pump, absorbent media dispenser, and the like.

A sensor interface module 516 monitors the various sensors 152, 154, 156, and 172 configured on the toilet 100 and generates signals to be used by the one or more other modules of the application 504 for administering the operation of the toilet 100. For example, the sensor interface module 516 may continually monitor the lid position sensor 152, and generate a signal that may be used by the agitator controller module 518 and/or vacuum pump controller module 520 for controlling the operation of the agitation device (e.g., vibrating mechanism 114 or absorbent media agitation device 158), and/or vacuum pump 116, respectively. As another example, the sensor interface module 516 may monitor the bag presence sensor 154, such as after the lid position sensor 152 detects that the lid 110 has been opened and/or other times and generate a signal that may be used by the alarm controller module 524 to generate an alarm if the bag 122 has not been placed within the bowl 104 after a specified period of time. As yet another example, the sensor interface module 516 may monitor the absorbent media level sensor 156 to determine whether the level of the absorbent media 124 stored in the lid 110 has been reduced to a specified level, and generate a signal that may be used by the alarm controller module 524 when the level of the absorbent media is below the specified level. As yet another example, the sensor interface module 516 may monitor the humidity sensor 172 to selectively energize the ultraviolet lamp 170 according to a humidity level inside of the bowl 104 or bowl 104/bag 122.

An agitator controller module 518 is coupled to the agitation device (e.g., vibration mechanism 114, absorbent media agitation device 158, or other agitation mechanism) and controls the operation of the agitation device, such as whether the agitation device is on or off. For example, the agitator controller module 518 may include a timer that turns the agitation device on or off after a specified period of time. In one embodiment, the agitator controller module 518 may be configured to turn the agitation device partially on, such as via a pulse width modulation (PWM) algorithm, that causes the agitation device to operate at a fraction of its fully on power. The vibrator controller module 518 may include multiple partially on settings for optimizing the agitation of different types of absorbent media having differing sizes, weights, and resiliency.

A vacuum pump controller module 520 controls the operation of the vacuum pump 116. For example, the vacuum pump controller module 520 may receive signals from the sensor interface module 516 indicating whether the lid 110 is in the open position and whether the bag has been inserted into the bowl, and if so, turn on the vacuum pump 116 so that the disposable bag 122 may be urged against the side of the bowl 104. The vacuum pump controller module 520 may also be responsive to signals from the user interface module 514 to turn off the pump in response to user input so that the disposable bag 122 may be removed from the bowl 104 or to turn on the pump.

An absorbent media dispensing module 522 controls the operation of the absorbent media dispenser 146 to dispense absorbent media 124 from the hopper 134 to the disposable bag 122. For example, the absorbent media dispensing module 522 may receive signals from the sensor interface module 516 indicating whether the lid 110 is in the open position and whether the bag has been inserted into the bowl, and if so, turn on the dispenser 146 for a specified period of time so that a certain amount of absorbent media 124 may be dispensed from the hopper 134 into the disposable bag 122 or due to user-interface selection. For example, the absorbent media dispenser 146 may be responsive to a switch and/or other control circuit 118 hardware to dispense absorbent media into the disposable bag 122.

An alarm controller module 524 communicates with the other modules (e.g., the user interface module 514, the sensor interface module 516, the agitator controller module 518, and the vacuum interface module 520) to receive signals indicative of an alarm condition, and generate an alarm signal based on those signals. For example, if the alarm controller module 524 receives a signal from the sensor interface module 516 indicating that no bag 122 is present in the bowl 104 when the absorbent media dispensing module 522 turns on the dispenser 146 to dispense absorbent media 124, the alarm controller module 524 may generate an alarm and communicate with the absorbent media dispenser controller 522 to turn off the dispenser 146 until a bag 122 is placed in the bowl 104. As another example, the alarm controller module 524 may receive signals from the sensor interface module 516 indicating that the level of the absorbent media 124 in the lid 110 is below a specified threshold level and generate an alarm to alert the user that additional absorbent media 124 needs to be added to the hopper 134.

It should be appreciated that the modules described herein are provided only as an example of a computing device that may execute the application 504 according to the teachings of the present invention, and that other computing devices may have the same modules, different modules, additional modules, or fewer modules than those described herein. For example, one or more modules as described in FIG. 5 may be combined into a single module. As another example, certain modules described herein may be encoded and executed on other circuits, such as another circuit that is separate from the control circuit 118.

Figure 6A:
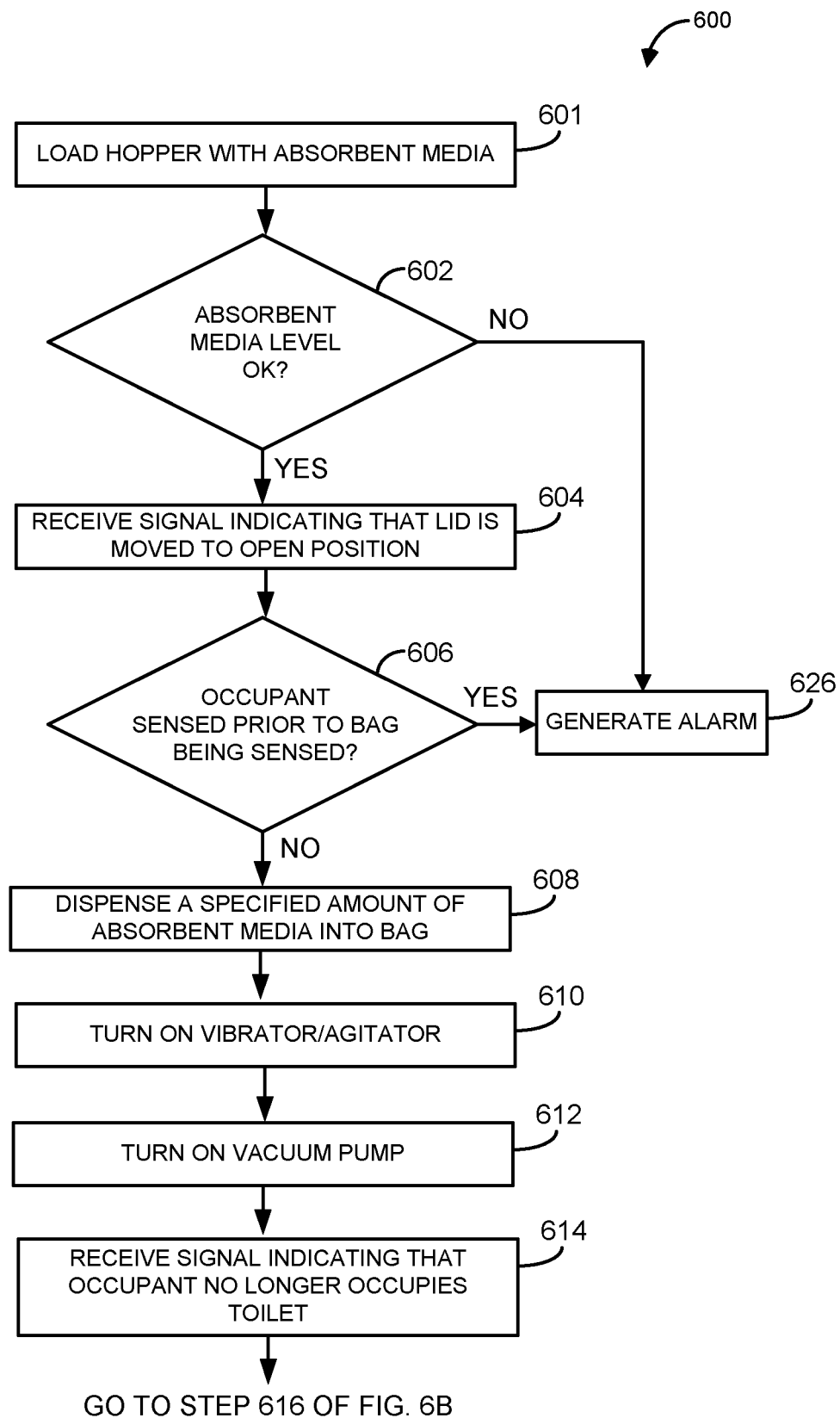
FIGS. 6A and 6B illustrate an example process that may be performed by the application according to the teachings of the present disclosure.
Figure 6B:
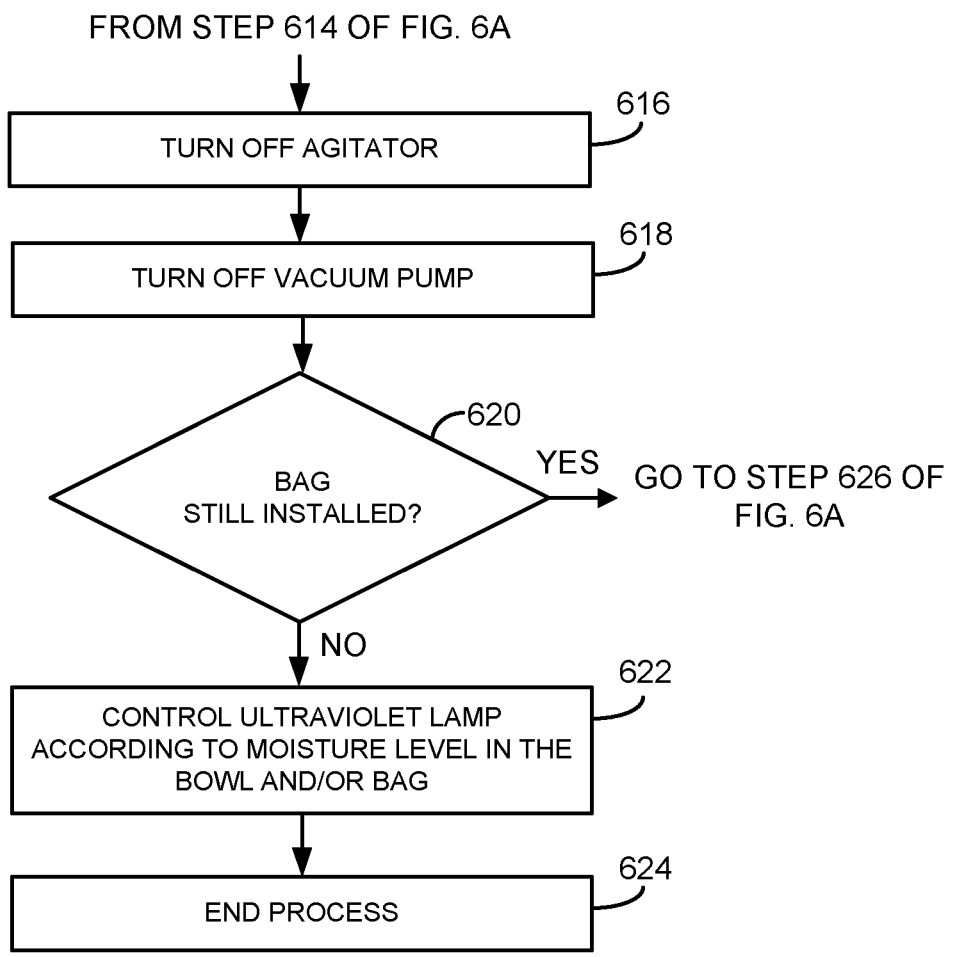

FIG. 6 illustrates an example process that may be performed by the application 504 according to the teachings of the present disclosure to control the operation of the toilet 100. Although the example process described herein below is directed primarily to a computer-based application implemented in a memory and executed by a processor, the steps described herein may also be applicable to other types of control circuits, such as a digital or analog hardware circuit employing discrete electrical components.

Initially in step 601, the absorbent media hopper 134 may be loaded with absorbent media 124 by moving the lid 110 to the open position, opening the access door 144, and pouring the absorbent media 124 into the absorbent media hopper 134. Also, an air filter 172 may be placed over the outlet of the vacuum pump 116. Thereafter, the toilet 100 and associated application 504 are ready for use.

In step 602, the application 504 determines, using the absorbent media level sensor 156, whether the absorbent media level is sufficient. If so, processing continues at step 604; otherwise, processing continues at step 626 in which an alarm is generated using a suitable output mechanism, such as the user interface 512 of the control circuit 118. In one embodiment, the application 504 may also display a message on the user interface 512 informing the user to add additional absorbent media to the absorbent media hopper 134.

In step 604, the application 504 receives a signal from the lid position sensor 152 indicating that the lid 110 has been moved to the open position. Receipt of the signal from the lid position sensor 152 typically indicates that the toilet is being prepared for use.

In step 606, the application 504 determines, using the occupant sensor 174, whether a signal has been received indicative of the user occupying the toilet 100 prior to a signal received from the bag sensor 154. If not, processing continues at step 608; otherwise processing continues at step 626 in which an alarm is generated to alert the user that the toilet 100 is being improperly used. Additionally, the application 504 may generate, using the user interface 512 that a bag 122 should be installed prior to occupying the toilet 100.

In step 608, the application 504 controls the dispenser 146 to dispense a specified amount of absorbent media into the bag 122. The specified amount of absorbent media 124 may be set according to various factors, such as how long the dispenser 146 is energized, the speed of the dispenser 146, and the weight and/or granularity of the absorbent media 124. The application 504 may cause the dispenser 146 to immediately dispense the absorbent media, or it may wait for a specified period of time (e.g., approximately 1 to 15 seconds) prior to having the absorbent media dispensed. For example, the application 504 may be configured to wait for approximately 5 seconds after the bag sensor 154 has detected the presence of the bag 122 to allow the user to releasably secure the bag 122 to the bowl 104. In an alternative embodiment, the application 504 may be responsive to user input inputted from either the user interface 512 or a switch mounted on the housing 102 to manually control the dispenser 146 for dispensing the absorbent media.

In steps 610 and 612, the application 504 turns on the agitation device (e.g., vibration mechanism 114, absorbent media agitation device 158, or other agitation mechanism) and the vacuum pump 116, respectively. For example, the application 504 may turn on the agitation device and/or vacuum pump 116 immediately after the dispenser 146 has been turned off, or after a specified period of time after the dispenser 146 has been turned off or in response to one or more sensor inputs, such as the occupant sensor 174 indicating the presence of an occupant or other sensor. In an alternative embodiment, the application 504 may be responsive to user input inputted from either the user interface 512 or one or more other switches mounted on the housing 102 to turn the agitation device and/or vacuum pump 116 on. Additionally, the agitation device may be turned on simultaneously with the vacuum pump 116 or at a different time from when the vacuum pump 116 is turned on.

In step 614, the application 504 receives a signal from the occupant sensor 174 indicating that the occupant no longer occupies the toilet 100. Thereafter, the application 504 turns off the vibrating mechanism 114/absorbent media agitation mechanism 158 and/or vacuum pump 116 in steps 616 and 618.

In step 620, the application 504 determines whether a signal has been received from the lid position sensor 152 indicating that the lid 110 has been moved to the closed position prior to a signal received from the bag sensor 154 indicating that the disposable bag 122 has been removed from the bowl 104. If not, processing continues at step 622; otherwise processing continues at step 626 in which an alarm is generated to alert the user that the bag 122 needs to be removed from the toilet 100. Additionally, the application 504 may generate, using the user interface 512, that the bag 122 should be removed from the bowl 104 prior to closing the lid 110.

In step 622, the application 504 continually monitors the moisture level inside the bowl 104 or the bag 122 if still inside the bowl 104 using the humidity sensor 172 to control operation of the ultraviolet lamp 170 when the toilet 100 is not in use. For example, after use of the toilet 100, humidity levels inside the bowl 104 may remain at an elevated level for an extended period of time, particularly if the bag 122 is inadvertently left inside of the bowl 104. To maintain the toilet 100 in a sanitary condition, the application 504 may activate the ultraviolet lamp 170 such that any pathogens, such as germs and/or bacteria, may be reduced or eliminated.

Processing continues for additional usage cycles of the toilet 100 as described above with reference to steps 602 through 622. Nevertheless, when use of the toilet 100 and associated application 504 are no longer needed or desired, the process ends in step 624.

Figure 7:
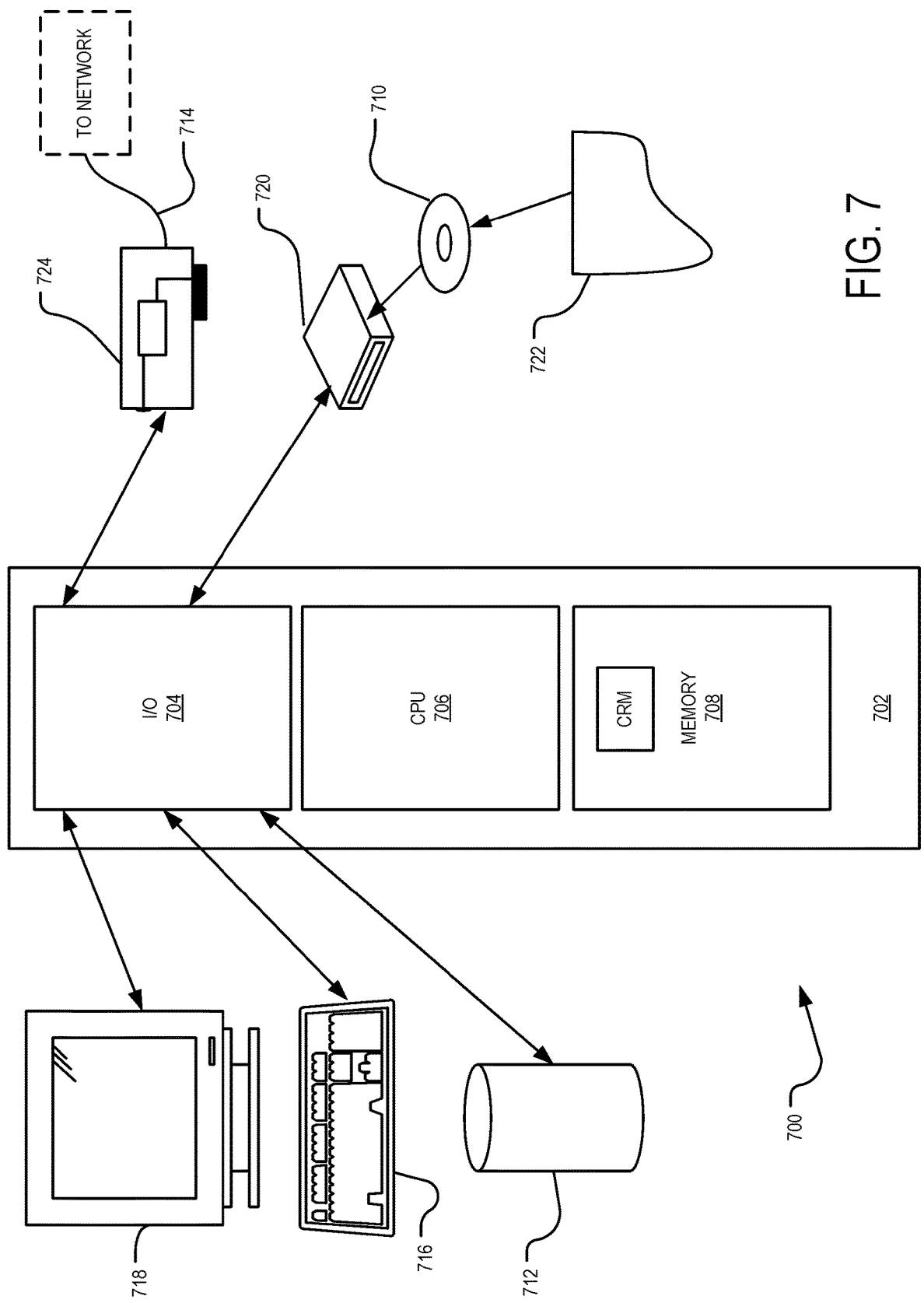
FIG. 7 illustrates a block diagram of an example computer device for use with the example embodiments.

FIG. 7 illustrates an example computing system 700 that may implement various systems, such as the control circuit 118, and methods discussed herein, such as process 600. A general purpose computer system 700 is capable of executing a computer program product to execute a computer process. Data and program files may be input to the computer system 700, which reads the files and executes the programs therein such as the application 504. Some of the elements of a general purpose computer system 700 are shown in FIG. 7 wherein a processing system 702 is shown having an input/output (I/O) section 704, a hardware central processing unit (CPU) 706, and a memory section 708. The processing system 702 of the computer system 700 may have a single hardware central-processing unit 706 or a plurality of hardware processing units. The computer system 700 may be a conventional computer, a server, a distributed computer, or any other type of computing device, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other hardware media or hardware mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 704 is connected to one or more optional user-interface devices (e.g., a user interface such as a keyboard 716 or the user interface 512), an optional disc storage unit 712, an optional display 718, and an optional disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 708, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by a floppy drive unit, a tape drive unit, or other storage medium drive unit. An optional network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 712 or the DVD/CD-ROM medium 710, and/or other external storage devices made available and accessible via a network architecture. The source code executed by the control circuit 118 may be embodied by instructions stored on such storage systems and executed by the processing system 702.

Some or all of the operations described herein may be performed by the processing system 702, which is hardware. Further, local computing systems, remote data sources and/or services, and other associated logic represent firmware, hardware, and/or software configured to control operations the system 100 and/or other components. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A toilet apparatus comprising:
a waste material receiving bowl with an opening at a top of the waste material receiving bowl;
a bag to receive and retain waste material and an absorbent media introduced through the opening;
an agitation device to agitate the absorbent media and the waste material at a lower portion of the bag to cause the absorbent media to at least substantially cover the waste material while the agitation device is not contacting the absorbent media and the waste material;
a plurality of levers spaced along a periphery of a bottom of the waste material receiving bowl;
a disk including an eccentrically mounted cam; and
a motor to rotate the disk such that the cam alternatively lifts each lever for agitating the absorbent media and the waste material in the bag.

2. A method for a toilet apparatus comprising:
providing a waste material receiving bowl with an opening at a top of the waste material receiving bowl;
providing a bag to receive and retain waste material and an absorbent media introduced through the opening;
agitating, using an agitation device, the absorbent media and the waste material at a lower portion of the bag to cause the absorbent media to at least substantially cover the waste material while the agitation device does not contact the absorbent media and the waste material;
a plurality of levers spaced along a periphery of a bottom of the waste material receiving bowl;
a disk including an eccentrically mounted cam; and a motor to rotate the disk such that the cam alternatively lifts each lever for agitating the absorbent media and the waste material in the bag.

* * * * *